United States Patent

Nguyen-Huu

Patent Number: 5,195,190
Date of Patent: Mar. 23, 1993

[54] WATER CONSERVING TOILET TANK ADAPTER

[76] Inventor: Anh A. Nguyen-Huu, 20393 Kent Way, Los Gatos, Calif. 95030

[21] Appl. No.: 700,630

[22] Filed: May 15, 1991

[51] Int. Cl.⁵ .............................................. E03D 1/34
[52] U.S. Cl. .......................................... 4/378; 4/415
[58] Field of Search ............ 4/324, 325, 378, 402–404, 4/392, 393, 387, 415

[56] References Cited

U.S. PATENT DOCUMENTS

| | | | |
|---|---|---|---|
| 1,348,662 | 8/1920 | Pasman | 4/387 |
| 1,570,681 | 1/1926 | Kirkham | 4/378 |
| 3,955,218 | 5/1976 | Ramsey | 4/324 |
| 4,101,986 | 7/1978 | Ng et al. | 4/325 |
| 4,106,136 | 8/1978 | Lippincott | 4/378 X |
| 4,122,564 | 10/1978 | Addicks et al. | 4/415 X |
| 4,438,536 | 12/1981 | Rivera | 4/343 |
| 4,561,131 | 12/1985 | David | 4/386 |
| 4,787,103 | 11/1988 | Endo | 4/441 |
| 4,935,969 | 6/1990 | Farnsworth | 4/484 |
| 4,979,241 | 12/1990 | Jomha et al. | 4/386 |
| 4,984,312 | 1/1991 | Pickerrell et al. | 4/378 |

*Primary Examiner*—Charles E. Phillips
*Attorney, Agent, or Firm*—Michael J. Hughes

[57] ABSTRACT

A water conserving toilet tank adapter device (10) is provided for use in tank reservoirs (14) of conventional toilets (12). The adapter (10) is a retrofit device for insertion into the tank outlet (18) which effectively raises the level of the drain so as to reduce the amount of water utilized in each flushing cycle. The adapter (10) includes; an outlet tube portion (30) having an interior diameter which is less than that of the tank outlet (18); a swirl disk portion (32), having swirl grooves (46) formed on a construction slope (44) for imparting angular velocity to flush water flowing therethrough; an extension portion (34) for raising the effective drain height; and a flapper rod portion (36) for supporting a conventional ball flap valve (24). An adaptive ring (38) is provided to assure a watertight seal with angularly arrayed tank outlets (18). The adapter (10) provides enhanced effective pressure by using a higher water column and angular flow to compensate for reduced water quantity in each flush cycle.

15 Claims, 3 Drawing Sheets

WATER CONSERVING TOILET TANK ADAPTER

TECHNICAL FIELD

The present invention relates generally to plumbing equipment and more specifically for equipment utilized in fluid flowing from a reservoir in a rapid fashion. In particular, the preferred embodiment of the present invention is a water conserving retrofit adapter for utilization in a standard toilet or water closet reservoir.

DESCRIPTION OF THE PRIOR ART

The human species is the one species that adapts its environment to its own needs rather than adapting to the circumstances of the environment. Accordingly, humans have a tendency to live in circumstances and conditions for which they are not naturally adapted. Furthermore, population pressure has caused much larger numbers of humans to live in certain areas than there are resources available to support. One of the resources which is most strained by the press of human population is that of water. Despite the effectively infinite capacity of the ocean, fresh usable water is a limited and precious commodity, especially in arid regions of the globe. Periodic droughts and shortages, combined with excess population, also cause shortages in areas which are not traditionally short on water. An increased awareness of the problems of water shortages is causing technology to find ways to conserve water while accomplishing purposes which ordinarily require larger quantities of water.

One utilization that has become a major source of water use is that of the water closet or common toilet. Although this invention has done wonders in minimizing disease by improving hygienic conditions, it has the drawback of requiring a substantial quantity of water for effective use. A typical American toilet utilizes approximately 9.8 liters (2.6 gallons) of water for each flush. Needless to say, this quantity of water, especially if it is standard fresh water, as is the case in most situations, has much better utilizations than to flush a toilet. Accordingly, it has been the desire of a great number of innovators to attempt to minimize the amount of water utilized in flushing of toilets, as well as altering the characteristics of the water utilized in such a manner that the drinkable fresh water is not used for this sort of purpose, in which the cleanliness of the incoming water is not a major factor.

A variety of mechanisms have been utilized in an attempt to conserve water while maintaining the efficacy of a toilet flushing operation. Since most standard American toilet tanks are constructed with a supersufficiency of water capacity, acceptable results may be obtained in many circumstances by simply reducing the capacity of the tank by inserting some voluminous object, such as a brick or a full milk carton. This can have the effect of reducing the amount of water which is delivered to the toilet bowl in each flushing operation. However, it can have the disadvantage, in many cases, of reducing the water quantity to such an extent that a single flush does not clean the bowl effectively. When this occurs, a second flush is required, thus destroying the value of the conserving technique.

Other techniques have attempted to use dual flush mechanisms, such as that disclosed in U.S. Pat. No. 4,561,131, issued to C. David, which utilizes a low quantity flush for liquid waste and a larger quantity, higher pressure, flush for solid wastes. A method such as these can be effective but requires replacement of substantial preexisting hardware and is complex in its operation.

Another mechanism utilizing a higher pressure flush, and consequently a lesser volume requirement to achieve the same degree of cleansing, is found in U.S. Pat. No. 4,438,536, issued to A. Rivera. In this invention an increased gravity differential is utilized by mounting the tank reservoir in a position substantially above the toilet bowl and utilizing the increased pressure resulting therefrom. The application of this principle, known since ancient time, allows utilization of a smaller quantity reservoir with equal cleansing affect. However, it does also require special construction in order to replace the standard tank reservoir with a new and differently mounted reservoir. Furthermore, it is not always physically available in modern houses, nor is it considered esthetically pleasing by all.

Although a variety of water conservation methods relating to toilet flushing have been utilized in the prior art, substantial room for improvement remains. In particularly, it is desirable to provide a water conserving toilet flush system which is attractive to the average person, comes with a variety of features such as ease of use, low cost and relative effectiveness.

BRIEF DESCRIPTION OF THE INVENTION

Accordingly, it is an object of the present invention to provide a toilet tank adapter which is designed so as to adapt, in a retrofit manner, to the predominant types of toilet tank reservoirs available in the United States.

It is another object of the present invention to provide an apparatus which may reduce water usage substantially in the standard toilet flushing operation.

It is yet another object of the present invention to provide an apparatus which achieves comparable cleaning results within the toilet bowl with a reduced quantity of water.

It is a further object of the present invention to provide a water conservation apparatus for use with a toilet tank reservoir which is easily installed and utilized by the average person.

It is yet another object of the present invention to provide a water conserving water tank adapter which does not interfere substantially with the flow path of water within the toilet reservoir, and thus does not cause stagnant water, which encourages bacterial growth and other undesirable results.

Briefly, the preferred embodiment of the present invention is a water conserving toilet tank adapter which is adapted for utilization in a great majority of toilet tank reservoirs utilized in the United States. The preferred embodiment is a adapter which may be directly inserted into a standard toilet tank, without the use of tools, and will operate properly with the existing hardware. The adapter raises the height of the outlet within the toilet tank in a manner so as to reduce the amount of water which is allowed to flow through the outlet when the standard flap valve is opened in a toilet flush cycle. The adapter compensates for the reduced volume of water by increasing the effective pressure in a twofold manner, both by reducing the size of the opening and by providing grooves causing the water to swirl as it passes through the adapter pipe and the subsequent piping, thus increasing cleansing effectiveness with a reduced quantity of water.

For some styles of toilet tanks outlet, the preferred embodiment of the present invention is a one piece unit adapted to fit directly therein. In the instances of toilet tank outlets which are angled with respect to the bottom of the tank, an adaptive ring is provided with the preferred embodiment to insure a tight fit with this nature of outlet.

The preferred embodiment includes an outlet pipe portion adapted to depend into the opening of the toilet tank outlet. A swirl slope portion is situated above the top of the outlet pipe and acts to reduce the flow diameter. The swirl slope is provided with swirl grooves adapted to impart a swirling motion to the flowing fluid passing therethrough. An angled upper portion extends upward from the swirl portion to provide a proper diameter for a standard flap valve and also to receive the flap valve in an angled manner. A flapper rod is an integral part of the adapter and extends outward and upward from the upper portion. The flapper rod includes a pair of lateral flap pivot arms for supporting a standard variety of flap valves which are adapted to mate with the upper edge of the outlet portion. The preferred embodiment of the adapter is constructed so as to mate in a non-leaking fashion with existing toilet outlet valve structures and also to be mounted in such a manner that the standing flapper rod does not interfere with existing components. It is adapted so as to be installable by an ordinary user in a very short period of time and to operate in exactly the same manner as the existing hardware, so that its existence is transparent to the user, once installed.

An advantage of the present invention is that it is inexpensive to manufacture.

Another advantage of the present invention is that it reduces the amount of water utilized in a toilet flush while maintaining cleansing effectiveness by pressure augmentation, thus eliminating the need for "double flushing".

A further advantage of the present invention is that it is adapted to mate with a variety of the most commonly utilized toilet reservoir tanks and is easily installed by an ordinary person.

Still another advantage of the present invention is that it provides a leakproof water conservation system which does not cause stagnant water to occur within the toilet reservoir.

Yet another advantage of the present invention is that it may reduce water use in standard flushing operations by as much as thirty five percent.

A further advantage of the present invention is that it provides a new flow path for the exit water which is not easily bypassed, and thus reduces potential leakage.

Still another advantage of the present invention is that it effectively raises the height of the outlet opening, thus increasing the column pressure on the flush water, thereby increasing the cleansing ability.

A still further advantage of the present invention is that the swirling motion imparted by the swirl grooves aids cleansing of the toilet bowl with a reduced water quantity.

These and other objects and advantages of the present will become clear to those skilled in the art upon a review of the following specification, the accompanying drawings and the appended claims.

BEST MODE OF CARRYING OUT THE INVENTION

Figure 1:
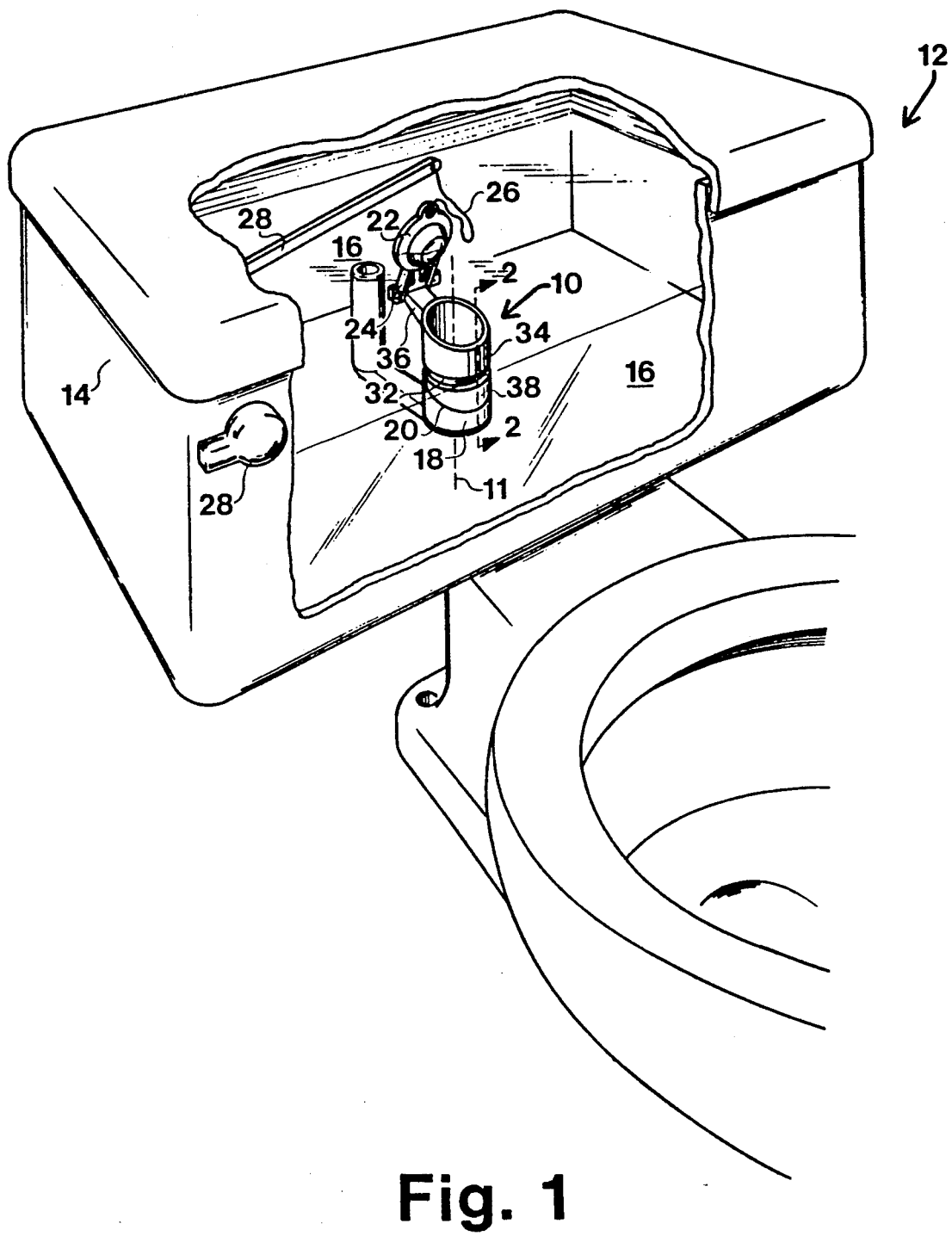
FIG. 1 is a perspective view of a portion of the interior of a standard toilet reservoir tank, showing a water conserving toilet tank adapter according to the present invention installed therein.

The preferred embodiment of the present invention is a water conserving toilet tank adapter which is intended for use in any of a wide variety of the most common types of residential toilets found in the United States. The preferred embodiment is illustrated in a perspective manner in FIG. 1 and is designated therein by the general reference character 10 As may be seen from the illustrations FIG. 1 and FIG. 2, the water conserving toilet tank adapter 10 is generally symmetrical about a plane including a vertical axis 11 and line 2—2, in certain portions, is radially symmetrical about the axis 11.

In the illustration of FIG. 1, the adapter 10 is shown in conjunction with a common residential toilet 12. The adapter 10 is intended for utilization in the interior of a common design of toilet tank (reservoir) 14 which is adapted to contain a quantity of water 16 until the water 16 is released to the toilet bowl (not shown) upon flushing.

The water 16 is delivered from the tank 14 to the bowl by way of a tank outlet 18 situated at or near the bottom of the tank 14. The upper surface of the tank outlet 18 is ordinarily provided with a sealing ring 20 which mates with a ball flap valve 22 to prevent flow of the water 16 through the tank outlet 18 when the ball flap valve 22 is in a closed orientation. The tank outlet 18 illustrated in FIG. 1 is of the common slanted type of tank outlet is. Certain other tank outlets are also in commercial utilization in which the top of the tank outlet 18 is parallel to the lower surface of the interior of the tank 14, rather than slanted as is the tank outlet is illustrated in FIG. 1.

The flushing mechanism of the ordinary toilet tank 14 utilizes the ball flap valve 22. When the ball flap valve 22 is engaged with the sealing ring 20 in a closed position, no water flows through the tank outlet 18. However, the ball flap valve 22 is pivotally mounted by way of a pair of flap pivot arms 24 so that it may be lifted off the sealing ring 20 by vertical lifting pressure applied through a flap lift cord 26 which is connected to a flush lever 28. Pressure on the flush lever 28 lifts the ball flap valve 22 out of conjunction with the sealing ring 20 and allows water 16 to flow through the tank outlet 18 after the user has flushed the toilet. The ball flap valve 22 is selected to be sufficiently buoyant that once the flow has started it will not cease until the level of the water 16 has reached the level of the tank outlet 18. However, when the flush cycle is completed the ball flap valve 22 will return to engaging the sealing ring 20 by virtue of gravity, since it will no longer be supported by buoyancy of the water.

The above components are standard components in most residential toilets 12 and will be present prior to installation of the water conserving toilet tank adapter 10. Installation of the adapter 10 nearly utilizes all of the existing elements and merely requires a minor degree of remounting. The adapter 10 is designed such that the operation of the toilet flushing mechanism is essentially unaltered.

The water conserving toilet tank adapter 10, itself, is a unitary construction which is adapted to mate with the tank outlet 18 and the ball flap valve 22. The adapter 10 may be considered as including an outlet tube portion 30 which extends downward into the tank outlet 18, a swirl disk portion 32 which corresponds approximately with the top of the tank outlet 18, an extension portion 34 which extends upward from the tank outlet 18 and a flapper rod portion 36 which provides both a mounting element and a back stop element for the ball flap valve 22.

In the case of a tank outlet 18 having an opening aligned at an angle with respect to the bottom of the tank as illustrated in FIG. 1, the adapter 10 is further provided with an adaptive ring 38 which allows the adapter 10 to mate in a vertical orientation about the axis 11 with the angled tank outlet 18. The adaptive ring 38 is a separate element which is placed over the outside of the outlet tube portion 30 and is then slid up against the swirl disk portion 32 to provide a watertight seal for the adapter 10 against the sealing ring 20.

The outlet tube portion 30 is a simple pipe-like structure having a tube wall 40 having a discrete thickness such that the interior of the outlet tube portion 30 is of a lesser diameter than the interior of the original tank outlet 18. This decreased diameter is important in the increased pressure factor which permits the adapter 10 to deliver effective cleansing force with a reduced quantity of water 16.

The swirl disk portion 32 is formed at the upper end of the outlet tube portion 30 and, in the illustration of FIG. 1, rests directly on top of the adaptive ring 38. The swirl disk portion 32 is an angular portion of a frustum of a concentric cone, with an exterior cone shape defined as a seal ring slope 42 forming the outside of the swirl disk portion 32. The seal ring slope 42 is adapted to mate with the adaptive ring 38 to form a water tight seal in the illustration of FIG. 1 or to mate directly with a horizontally arrayed tank outlet 18, as is found on certain types of residential toilets 12.

The interior concentric cone defining the swirl disk 32 is reflected in an interior constriction slope 44 which is separated by an extension of the tube walls 40 from the seal ring slope 42. The constriction slope 44 is adapted to constrict the interior diameter of the adapter 10 within the swirl disk 32 from a greater diameter at its upper extent to a narrower diameter confirming to the diameter of the interior of the outlet tube portion 30. The constriction slope 44 is provided with a plurality, in the preferred embodiment six, equally circumferentially spaced swirl grooves 46. As is illustrated in FIG. 2 and FIG. 3, the swirl grooves 46 are narrower at their upper ends and wider at their lower ends and are also angled in such a manner that they induce angularly swirling force in the water 16 flowing through the swirl disk portion 32.

Situated directly above the swirl disk portion 32 is the extension portion 34. The extension portion 34 serves the dual purposes of raising the effective outlet from the level of the original outlet 18 to a greater height, thus limiting the amount of water 16 which flows through the tank outlet 18 with each flush, and also acts as to provide additional pressure to the flush operation, by creating a higher effective water column and also by utilizing a reducing diameter in the flow path.

Figure 2:
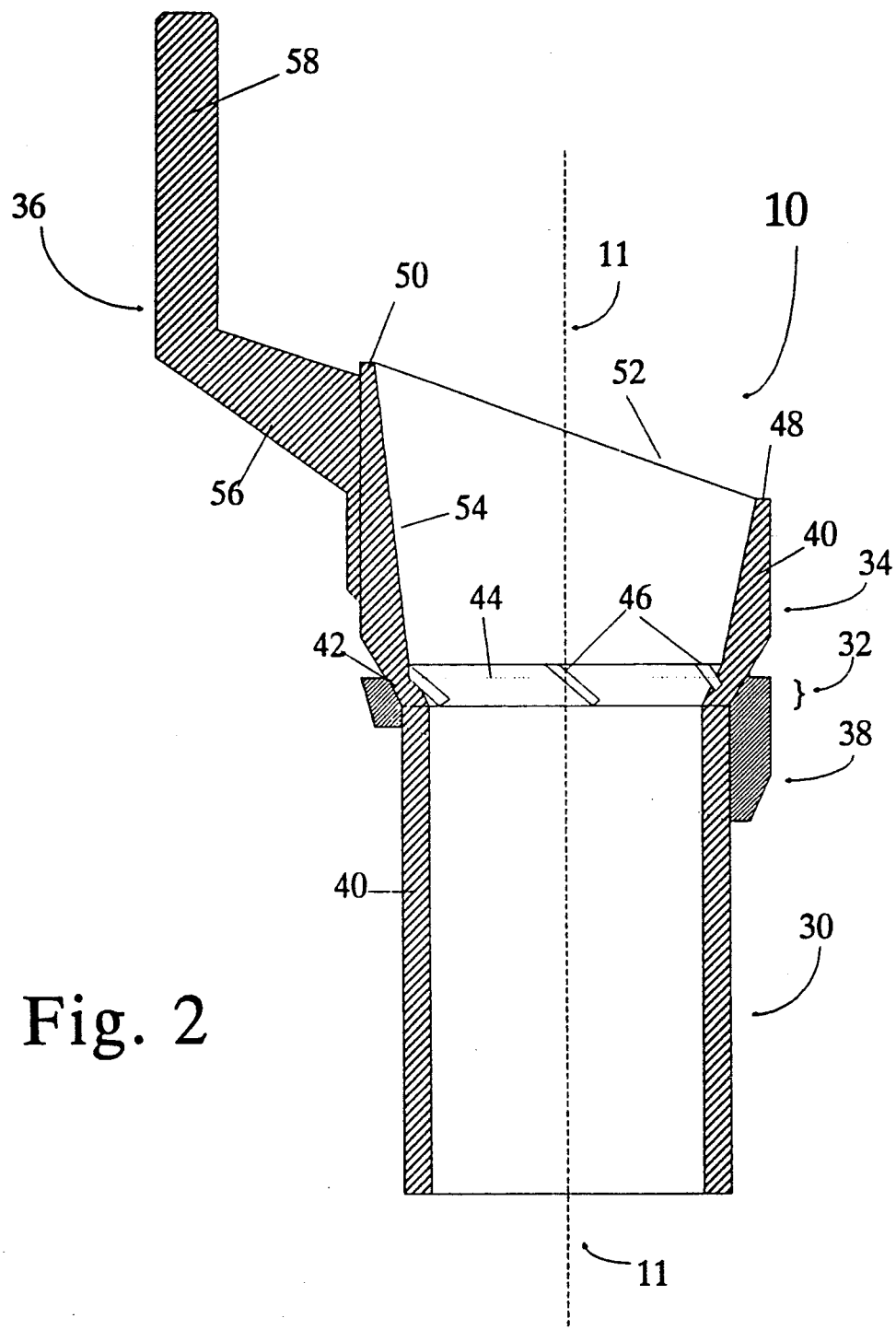
FIG. 2 is a cross-sectional view taken along line 2—2 of FIG. 1, showing only the preferred embodiment of the adapter.
Figure 3:
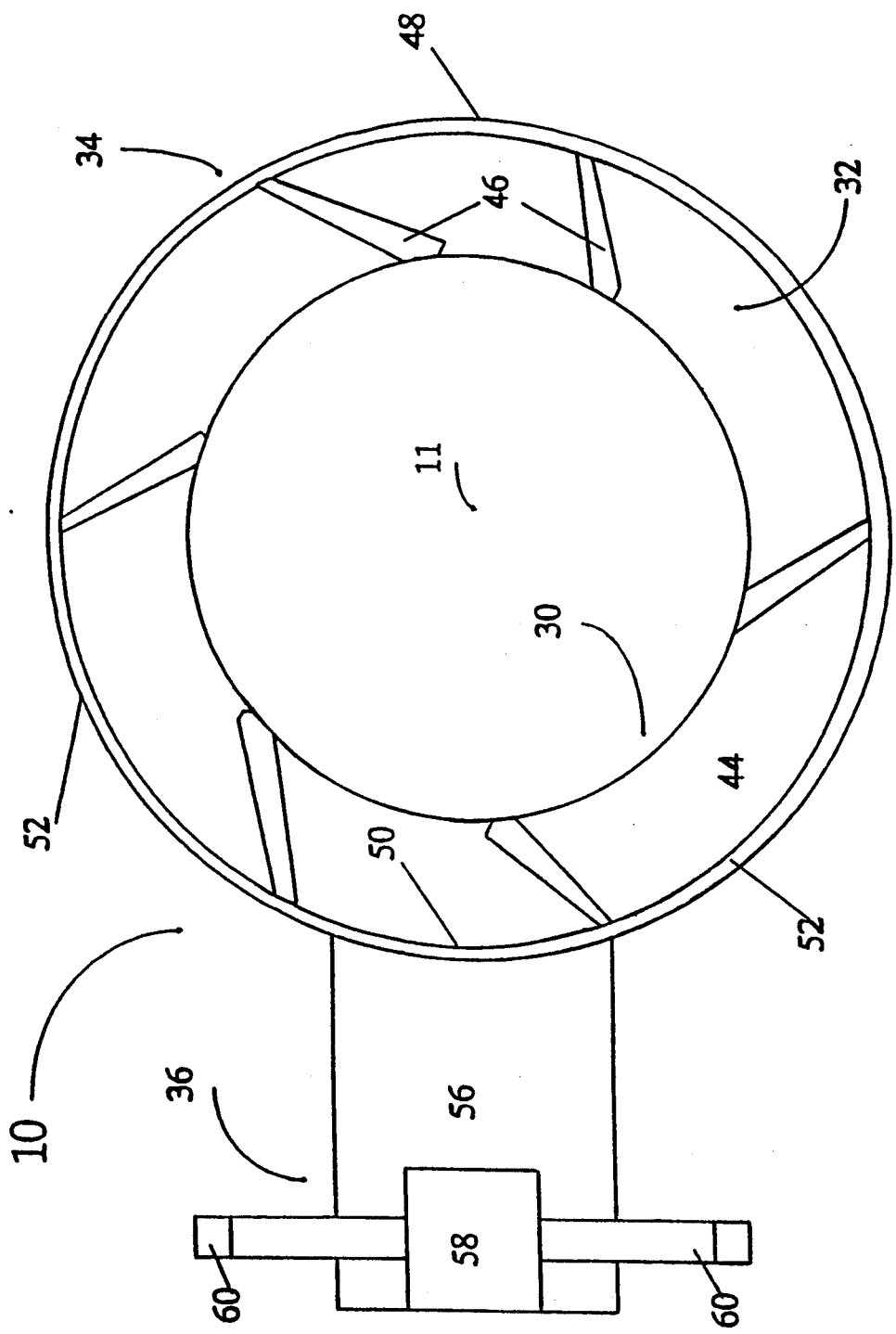
FIG. 3 is a top plan view of the preferred embodiment.

The extension portion 34, as is best illustrated in the cross-sectional view of FIG. 2, extends from a minimum wall height position 48 on one edge (opposite the flapper rod 36) to a maximum wall height position 50 on the opposing edge (adjacent to the flapper rod portion 36). A sealing rim 52 extends circumferentially about the upper edges of the tube wall 40 in the extension portion 34 and is adapted to mate with the ball flap valve 22. The sealing rim 52 is angled at a 15° angle to horizontal, congruent to the original angle of the tank outlet 18 of FIG. 1. This angle has been found to be effective in achieving the best seal of the flap valve 22 with the sealing rim 52 and also in achieving best return of the flap valve 22 to a closed position upon completion of the flush cycle. A constricting inside surface 54 is also provided in the extension portion 34 to augment the pressure of the water flowing therethrough. The arrangement of the constricting inside surface 54 (a hollow conical shape) is accomplished such that the effective interior diameter of the extension portion 34 is broader at the sealing rim 52 than at the interface with the swirl disk 32. The gradually decreasing diameter has an effect of directing the water 16 inward during the flush cycle and also increases the pressure in accordance with hydraulic principles.

The flapper rod portion 36 is integrally mounted with the extension portion 34 and extends outward therefrom so as to be attached in a vertical alignment with the maximum wall height position 50. The flapper wall portion 36 includes a cantilever portion 56 which extends laterally from the tube wall 40 a distance equivalent to the length of the flap pivot arms 24, when properly mounted. A restriction rod 58 is vertically mounted (parallel to the axis 11) from the distal end of the cantilever portion 56 to extend vertically therefrom. A pair of shoulder hooks 60 extend laterally from the restriction rod 58 and provide mounting hooks for the flap pivot arms 24. The shoulder hooks are equivalent to the flap pivot arms 24 of the existing hardware.

The entire flapper rod portion 36 is similar to that existing on the original tank outlet 18 and will operate in the same manner. That is, the shoulder hooks 60 provide the pivotal attachment for the ball flap valve 22 and the restriction rod 58 prevents the flap valve 22 from rotating about the shoulder hooks 60 to an extent greater than will allow a ready return to a sealed mode at the end of the flush cycle. It is necessary to provide a duplicative flapper rod portion 36 since the adapter 10 raises the height of the effective tank outlet above that of the original tank outlet 18. Accordingly, new mounting positions and restriction means must be provided for the flap valve 22.

The tank adapter 10 of the present invention is adapted to mate with the hardware found in conventional residential toilets 12. It is adapted to be installed without the use of any tools or special expertise. Accordingly, the dimensions of the adapter 10 conform to those of the existing hardware.

In the preferred embodiment 10 the outlet tube portion 30 is selected to have a vertical extent of 6.90 cm (2.75 inch) and an outside diameter of 4.39 cm (1.75 inch) to correspond to the inside diameter of a standard tank outlet 18. In the vicinity of the outlet tube portion 30 the tube wall is selected to have a thickness of 0.25 cm (0.10 inch).

The swirl disk portion 32 of the present invention is adapted to have a vertical extent of 0.63 cm (0.25 inch) and both the seal ring slope 42 and the constriction slope 44 are angled at 30° from the vertical axis 11. The extension portion 34 has an effective wall height of 3.49 cm (1.39 inch) from the upper edge of the swirl disk 32 to the minimum wall height position 48 and an effective height of 5.31 cm (2.12 inch) to the maximum wall height position 50. The effective angle of the constricting inside surface 54 is approximately 15° to the vertical axis 11.

The cantilever portion 56 extends from the extension portion 34 such that the restriction rod 58 and the shoulder hooks 60 are displaced laterally by an amount of 5.52 cm (2.20 inch) from the vertical axis 11. The restriction rod 58 extends 5.65 cm (2.25 inch) above the maximum wall height 50. The shoulder hooks 60 are mounted so as to be centered a height of 1.88 cm (0.075 inch) above the maximum wall height 50.

The preferred material for the water conserving toilet tank adapter 10 is ABS plastic. However, other materials which are amenable to manufacturing processes and are resistant to degradation in aqueous environments may also be utilized.

Although the preferred embodiment 10 has been described above in terms of specific dimensions, materials and the like it is understood that a variety of modifications and alterations may be made without departing from the spirit of the invention. Accordingly, the above disclosure is not to be construed as limiting and the appended claims are to be interpreted as encompassing the entire scope of the invention.

INDUSTRIAL APPLICABILITY

The present invention is adaptable for usage in a substantial majority of the homes in the United States and in any other circumstance in which common types of toilet tank reservoirs are utilized. It is particularly desirable in areas having drought conditions or chronic shortages of water, since it decreases the amount of water utilized in a flush cycle of an ordinary toilet without significantly decreasing the degree of cleansing achieved by the flush cycle.

It is expected that the water conserving toilet tank outlet adapter 10 of the present invention will be package as a two element unit, with the primary adapter 10 being packaged with an adaptive ring 38. The user will be able to install the adapter 10 on an existing tank outlet 18 without the use of special tools.

Typically, the user will drain the water from the toilet tank and prevent refill by any of a variety of means and then will remove the ball flap valve 22 from the existing tank hardware and set it aside. The adapter 10 may then be installed on a horizontally arrayed sealing ring 20 merely by inserting the outlet tube portion 30 into the tank outlet 18 and pushing downward until the seal ring slope 42 abuts against the sealing ring 20 and forms a water tight seal therewith. The flapper rod portion 36 will be offset slightly from the existing hardware so as to avoid interference therewith, but will be aligned closely enough so that the lifting provided by preexisting flap lift cord 26 will be essentially in the same vertical plane.

In the event that the user has a toilet tank 14 such as that illustrated in FIG. 1, in which the sealing ring 20 is situated at an angle with a respect to the bottom of the tank 14, the user will place the adaptive ring 38 on the outlet tube portion 30 prior to installation. The adaptive ring 38 is forced upward about the outside tube wall 40 and the outlet tube portion 30 until the upper edge of the adaptive ring 38 abuts against the seal ring slope 42. The adaptive ring 38 is rotationally aligned such that the minimum thickness portion of the adaptive ring 38 is slightly offset from the flapper rod portion 36. This slight offset is desirable such that the minimum thickness of the adaptive ring 38 may correspond to the highest edge of the sealing ring 20 so that a good water tight seal may be achieved with the adapter 10 being aligned with the vertical axis 11. The remaining installation steps will be identical to those discussed above.

Once installed, the water 16 may be allowed to flow back into the tank 14 and the toilet 12 is ready for use in exactly the same manner as prior to installation of the adapter 10. The difference will be that effective outlet, now provided at the sealing rim 52 of the adapter 10, is situated a distance above the prior tank outlet 18 such that a smaller quantity of water will be delivered to the toilet bowl in each flush cycle. Compensation for the smaller quantity is provided by the inside constriction surface 54, the restriction slope 44, the swirl grooves 46 and the outlet tube portion 30, which is of a lesser diameter than the original flow path from the tank 14 to the toilet bowl. This results in roughly equivalent cleansing action with a lower quantity of water. In a typical toilet tank 14 having a capacity 14.4 liters (3.8 gallons) of water, approximately 9.8 liters (2.6 gallons) is utilized in each flush cycle. This means that 8.3 liters (1.2 gallons) of water remains in the tank for mixing with fresh water during the refill cycle.

When the toilet tank outlet adapter 10 is installed in a typical tank of this nature, 6.1 liters (2.2 gallons) of water will remain in the tank below the level of the minimum wall height 48, at the completion of a flush cycle. This means that only 6.1 liters (1.60 gallons) is utilized in each flush cycle, a savings of approximately 35%. For a family of four this can result in a water saving of up to or exceeding four thousand gallons per year.

Because of the ease of installation, relatively low cost and substantial utility in saving water without detrimental side effects, it is expected that the water conserving toilet tank outlet adapter 10 according to the present invention will have industrial applicability and commercial utility which are both widespread in nature and long lasting in duration.

I claim:

1. A water conserving toilet tank outlet adapter, for use in conjunction with a tank outlet having a circular, generally upwardly arrayed opening into the tank, which opening mates with a valve component to selectively seal the opening, comprising:
   outlet tubes means adapted to fit within the opening, and to effectively reduce the diameter thereof;
   sealing means for providing an effective seal between the outlet tube means and the opening;
   hollow extension means affixed to the outlet tube means for extending upward from the opening so as to effectively raise the level of the opening to an inlet situated near the top of the extensions means, the extension means including a sealing ring at said inlet for mating with the valve component is selectively sealed; and
   swirl disk means interposed intermediate the outlet tube means and the extension means, said swirl disk means being in the form of a hollow annular portion, with the sealing means forming an exterior seal ring portion thereof and further including an interior constriction slope formed such that the interior diameter of said swirl disk means is greater at the interface between said swirl disk means and the extension means than at the interface between said swirl disk means and the outlet tube means.

2. The toilet tank outlet adapter of claim 1 wherein the exterior of the outlet tube means is adapted to closely fit within the opening.

3. The toilet tank outlet adapter of claim 1 wherein said constriction slope is provided with a plurality of swirl grooves so as to impart angular momentum to a fluid flowing through said swirl disk portion into the outlet tube portion.

4. The toilet tank outlet adapter of claim 1 wherein the interior diameter of the extension means is greater at said inlet than at an opposing lower extent thereof.

5. The toilet tank outlet adapter of claim 1 and further including
a flapper rod portion extending upward from a position laterally displaced from said sealing rim so as to provide attachment posts for the valve component and to provide a rotation backstop for the valve component.

6. The toilet tank outlet adapter of claim 5 wherein said flapper rod portion includes
a cantilever portion extending outward from the extension means;
a restriction rod extending upward from a distal end of said cantilever portion; and
shoulder hooks for pivotally supporting the valve component.

7. In a tank reservoir system adapted to be periodically emptied by a flushing operation, the system including a tank outlet situated at or near to the bottom of the tank reservoir with a liftable occlusion valve provided to selectively seal the outlet or open the outlet to allow fluid flow therethrough, the improvement comprising:
raising the effective height of the tank outlet by providing a hollow extension to extend upward from the tank outlet, the extension including a sealing ring to mate with the occlusion valve in the same manner as the prior seal mates with the tank outlet;
decreasing the effective diameter of the tank outlet by providing an outlet tube portion, connected to the hollow extension at an interface, for depending into the tank outlet, the inside diameter of the outlet tube being less than that of the tank outlet; and
inducing angular momentum in fluid flowing during the flushing operation by providing a contoured surface, including swirl grooves arranged radially about the interior of a swirl disk portion of the extension, over which the fluid flows, said swirl disk portion being situated at about the interface between the hollow extension and the outlet tube portion.

8. The improvement of claim 7 wherein
the extension further includes an attached flap rod portion to support and facilitate the occlusion valve.

9. The improvement of claim 7 wherein
the extension is provided with an inner surface having a decreasing diameter from said sealing ring to the interface with the outlet tube portion.

10. The improvement of claim 9 and further including and adaptive ring member for attachment to the outlet tube portion such that a fluid-tight seal is maintained with the tank outlet and such that the extension is supported to be arrayed about said vertical central axis.

11. The improvement of claim 7, wherein the extension and the outlet tube portion are arrayed so as to be generally mutually bilaterally symmetrical about a plane including a vertical central axis extending through the tank outlet.

12. A retrofit adapter for use in conjunction with a conventional toilet tank reservoir, the tank reservoir having internal components including a tank outlet situated at an empty water level position within the lower portion of the reservoir, adapted such that during a flush cycle flush water is delivered to a toilet bowl through the tank outlet, a flap valve for selectively sealing the tank outlet before and after flushing, for maintaining a filled water level in the reservoir, which filled water level is substantially higher than the empty water level, and flap valve opening means for opening the flap valve to begin the flushing cycle, the adapter comprising:
an outlet tube portion for depending into the tank outlet such that flushing causes water to flow along a fluid flow path extending through the outlet tube portion, the outlet tube portion having a lesser interior diameter than the tank outlet; and
an inlet portion situated along said fluid flow path, the inlet portion including an inlet opening situated within the reservoir at an inlet level, said inlet level being intermediate the filled water level and the empty water level, the inlet portion including a sealing rim at said inlet opening, said sealing ring being adapted to mate with the flap valve in such a manner that said inlet opening functionally replaces the tank opening during the flushing cycle; and
a swirling inducing contoured surface means situated within the inlet portion in the form of a swirl surface along the fluid flow path near the interface between the inlet portion and the outlet portion, the swirl surface including angular momentum inducing grooves therein to produce swirling in the water as it progresses along the fluid flow path into the outlet portion;
wherein water intermediate the empty water level and said inlet level, which water would, in the absence of the retrofit adapter, be flushed from the reservoir during the flushing cycle, is retained in the reservoir such that a lower volume of water is utilized in each flushing cycle, said lower volume being compensated for by increased effective pressure attributable at least partially to the induced angular momentum.

13. The retrofit adapter of claim 12 wherein the tank outlet is slanted such that the opening thereof is not horizontal and wherein
an adaptive ring member is further provided to facilitate a watertight interface between the outlet tube portion and the slanted tank outlet.

14. The retrofit adapter of claim 12 wherein
said fluid flow path is substantially vertically arrayed and corresponds to .the interior of the retrofit adapter, said fluid flow path decreasing in diameter from said inlet opening to a distal end of the outlet tube portion.

15. The retrofit adapter of claim 12 wherein
said lower volume is approximately sixty-five percent of the volume of water utilized in a flushing cycle occurring in the absence of the retrofit adapter.

* * * * *